United States Patent
Muller et al.

(10) Patent No.: US 10,322,722 B2
(45) Date of Patent: Jun. 18, 2019

(54) METHOD OF CONTROLLING AN AUTONOMOUS VEHICLE

(71) Applicant: GM GLOBAL TECHNOLOGY OPERATIONS LLC, Detroit, MI (US)

(72) Inventors: Brett T. Muller, Milford, MI (US); Joshua R. Auden, Brighton, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 15/293,968

(22) Filed: Oct. 14, 2016

(65) Prior Publication Data
US 2018/0105175 A1    Apr. 19, 2018

(51) Int. Cl.
| | |
|---|---|
| *B60W 30/18* | (2012.01) |
| *G05D 1/00* | (2006.01) |
| *B60W 10/06* | (2006.01) |
| *B60W 10/10* | (2012.01) |
| *B60W 10/20* | (2006.01) |
| *B60W 10/30* | (2006.01) |
| *B60R 16/037* | (2006.01) |

(52) U.S. Cl.
CPC .......... *B60W 30/18* (2013.01); *B60R 16/037* (2013.01); *B60W 10/06* (2013.01); *B60W 10/10* (2013.01); *B60W 10/20* (2013.01); *B60W 10/30* (2013.01); *G05D 1/0088* (2013.01); *B60W 2400/00* (2013.01); *B60W 2710/06* (2013.01); *B60W 2710/10* (2013.01); *B60W 2710/20* (2013.01); *B60W 2710/30* (2013.01); *B60W 2720/106* (2013.01)

(58) Field of Classification Search
CPC ...... B60W 30/18; B60W 10/06; B60W 10/10; B60W 10/20; B60W 10/30; G05D 1/0088
USPC .......................................................... 701/23
See application file for complete search history.

(56) References Cited

U.S. PATENT DOCUMENTS

| | | | | |
|---|---|---|---|---|
| 2010/0072290 | A1* | 3/2010 | Dage ................. | B60H 1/00657 236/51 |
| 2012/0072051 | A1* | 3/2012 | Koon ................. | G05D 1/0278 701/2 |
| 2012/0101689 | A1* | 4/2012 | Schramm ............ | B60Q 9/008 701/45 |
| 2014/0309934 | A1* | 10/2014 | Ricci .................. | H04W 4/21 701/537 |

* cited by examiner

*Primary Examiner* — Redhwan K Mawari
*Assistant Examiner* — Rodney P King
(74) *Attorney, Agent, or Firm* — Quinn IP Law

(57) ABSTRACT

A method of controlling an autonomously operating vehicle includes determining if the vehicle is currently occupied by a passenger, or if the vehicle is not currently occupied by a passenger. When the vehicle is currently occupied by a passenger, a vehicle controller controls at least one vehicle system to operate using a set of passenger present operating parameters. The set of passenger present operating parameters control the vehicle to provide a minimum level of passenger comfort. When the vehicle is not currently occupied by a passenger, the vehicle controller controls at least one vehicle system to operate using a set of passenger not-present operating parameters. The set of passenger not-present operating parameters control the vehicle for one of optimal energy efficiency, or for optimal vehicle diagnostic performance.

20 Claims, 3 Drawing Sheets

METHOD OF CONTROLLING AN AUTONOMOUS VEHICLE

TECHNICAL FIELD

The disclosure generally relates to control of an autonomous vehicle.

BACKGROUND

As used herein, the term "autonomous vehicle" should be interpreted as a vehicle capable of sensing its environment and surroundings, and navigating between locations, without any human input or control. An autonomous vehicle may also be referred to as a self-driving vehicle, a driverless vehicle, or a robotic vehicle. The development of autonomous vehicles is a relatively new endeavor, which presents new challenges in the vehicle control and operation, as well as new opportunities and new ways to control the autonomous vehicle that were not previously possible or desirable when a human operator was required for operating a vehicle.

SUMMARY

A method of controlling a vehicle is provided. The method includes determining, with a vehicle controller, if the vehicle is currently operating autonomously, or if the vehicle is not currently operating autonomously. The vehicle controller then determines if the vehicle is currently occupied by a passenger, or if the vehicle is not currently occupied by a passenger. When the vehicle is currently occupied by a passenger, the vehicle controller controls at least one vehicle system to operate using a set of passenger present operating parameters. The set of passenger present operating parameters controls the vehicle to provide a minimum level of passenger comfort. When the vehicle is currently operating autonomously and the vehicle is not currently occupied by a passenger, the vehicle controller controls at least one vehicle system to operate using a set of passenger not-present operating parameters. The set of passenger not-present operating parameters control the vehicle for one of optimal energy efficiency, or for optimal vehicle diagnostic performance.

A vehicle is also provided. The vehicle includes a body structure having a passenger cabin. A prime power source is attached to and supported by the body structure. The prime power source is operable to provide propulsive power for the vehicle. A plurality of wheels is attached to and supported by the body structure. The wheels are operable to transmit torque from the prime power source to a ground surface, and to steer the body structure. A suspension system interconnects the wheels and the body structure. A braking system is attached to and supported by the suspension system. The braking system is operable to resist rotation of the wheels. The vehicle includes a cabin temperature control system for heating or cooling an air temperature within the passenger cabin. A vehicle controller includes a processor and tangible, non-transitory memory on which is recorded an autonomous vehicle operation algorithm. The processor is operable to execute the autonomous vehicle operating algorithm to autonomously control operation of at least one of the prime power source, the plurality of wheels, the suspension system, the braking system, and the cabin temperature control system, without the presence or input of an operator. The tangible, non-transitory memory of the vehicle controller includes a passenger based control algorithm stored thereon. The processor is operable to execute the passenger based control algorithm to determine if the vehicle controller is currently executing the autonomous vehicle operating algorithm to operate the vehicle autonomously. The passenger based control algorithm is also operable to determine if the passenger cabin is currently occupied by a passenger, or is not currently occupied by a passenger, by a passenger sensor. When the passenger cabin is currently occupied by a passenger, the vehicle controller controls at least one of the prime power source, the plurality of wheels, the suspension system, the braking system, and the cabin temperature control system, using a set of passenger present operating parameters. The set of passenger present operating parameters control the vehicle to provide a minimum level of passenger comfort. When the vehicle controller is currently executing the autonomous vehicle operating algorithm to operate the vehicle autonomously and the passenger cabin is not currently occupied by a passenger, the vehicle controller controls at least one of the prime power source, the plurality of wheels, the suspension system, the braking system, and the cabin temperature control system, using a set of passenger not-present operating parameters. The set of passenger not-present operating parameters control the vehicle for one of optimal energy efficiency, or for optimal vehicle diagnostic performance.

Accordingly, when the vehicle includes no passengers and is operating autonomously, the vehicle may operate using the set of passenger not-present operating parameters. The passenger not-present operating parameters may control the vehicle in a manner that optimizes or maximizes energy efficiency, or controls the vehicle in a manner that may be unpleasant to a passenger for a purpose, such as to perform a diagnostic test. For example, the passenger not-present operating parameters may disable the passenger cabin heating system to conserve energy, because there are no passengers to accommodate. Similarly, the passenger not-present operating parameters may disable an entertainment system of the vehicle, or may alternatively adjust engine, transmission, and/or suspension operation to conserve energy. The vehicle controller may implement the passenger not-present operating parameters to set the operating points or conditions for the various vehicle systems to levels that may be unpleasant or undesirable for a passenger, because there are no passengers currently present in the vehicle. When the vehicle controller senses the presence of a passenger in the vehicle, then the vehicle controller implements the set of passenger present operating parameters to provide at least a basic level of comfort for the passenger(s). In so doing, passengers, when present, are provided with the basic level of comfort, and when no passengers are present, the vehicle may be optimized for energy efficiency or controlled in some other manner that may be undesirable to a passenger, such as to perform a diagnostic test.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
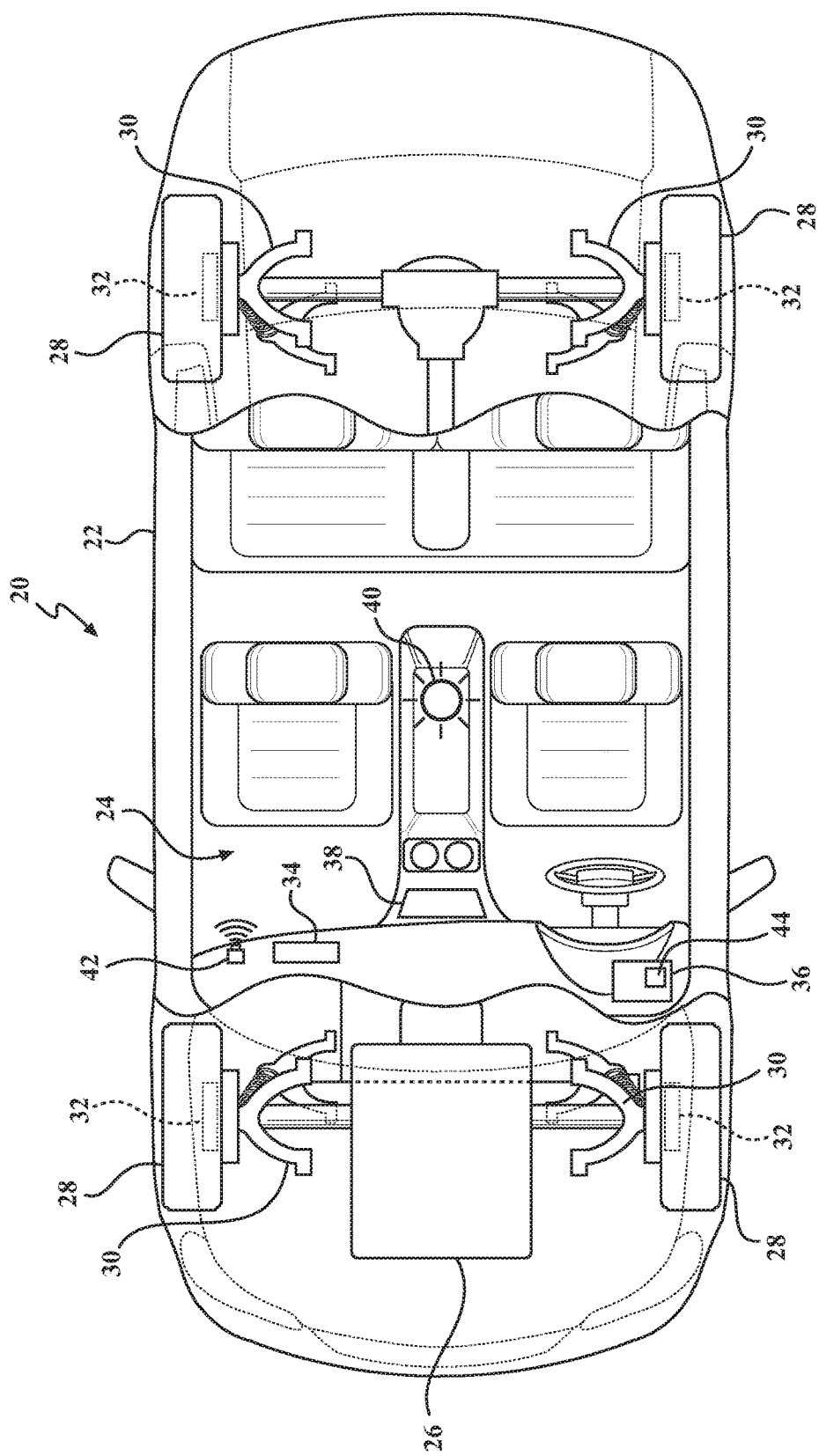
FIG. 1 is a schematic plan view of a vehicle.

Referring to the Figures, wherein like numerals indicate like parts throughout the several views, a vehicle is generally shown at 20 in FIG. 1. Referring to FIG. 1, the vehicle 20 may include any style and/or configuration, such as but not limited to, a car, a truck, a boat, a train, a plane, a tractor, etc. The vehicle 20 includes a body structure 22, which includes or defines a passenger cabin 24. As is known in the art, the body structure 22 may include, but is not limited to, a frame and body panels attached to the frame to structural form the body of the vehicle 20. The body structure 22 may be formed in any suitable manner, from any suitable materials, and include any combination of components for the specific application. The passenger cabin 24 may include, but is not limited to, an area or space of the vehicle 20 intended for occupants and/or cargo.

The vehicle 20 includes a prime power source 26. The prime power source 26 is attached to and supported by the body structure 22, and is operable to provide propulsive power. The prime power source 26 may include, but is not limited to, an internal combustion engine, an electric motor, or some other power generating device suitable for use in a vehicle 20. The prime power source 26 may be attached to the body structure 22 in any suitable manner, and may include other several different components and/or systems necessary for powering the vehicle 20. The specific configuration and operation of the prime power source 26 is not pertinent to the teachings of this disclosure, are known to those skilled in the art, and are therefore not described in detail herein.

The vehicle 20 may include a plurality of wheels 28, which are attached to and supported by the body structure 22 as is known in the art. The wheels 28 are operable to transmit torque from the prime power source 26 to a ground surface in order to propel the vehicle 20. Additionally, at least one of the wheels 28 may be operable to steer the body structure 22, as is known in the art. It should be appreciated that the vehicle 20 may include other components connecting the prime power source 26 and at least one of the wheels 28, such as but not limited to a transmission, a driveshaft, a final drive or differential, etc.

A suspension system 30 interconnects the wheels 28 and the body structure 22. The suspension system 30 allows relative emotion between the wheels 28 and the body structure 22. The suspension system 30 may include, but is not limited to, tires, springs, shocks, and linkages as is known in the art. The suspension system 30 may be passive, operate in the same manner without any input. Alternatively, the suspension system 30 may be actively controlled to provide varying levels of ride support. For example, the suspension system 30 may include electrically actuated dampers that are actively controlled by a computer to control the ride of the vehicle 20. The specific configuration and operation of the suspension system 30 is not pertinent to the teachings of this disclosure, are known to those skilled in the art, and are therefore not described in detail herein.

The vehicle 20 may further include a braking system 32 that is attached to and supported by the suspension system 30. As is known in the art, the braking system 32 is operable to resist rotation of the plurality of wheels 28. The braking system 32 may include any style of system, including but not limited to hydraulically actuated disc or drum brakes, electrically actuated brakes, or some other system capable of resisting rotation of the wheels 28. The specific configuration and operation of the braking system 32 is not pertinent to the teachings of this disclosure, are known to those skilled in the art, and are therefore not described in detail herein.

The vehicle 20 may further include a cabin temperature control system 34. The cabin temperature control system 34 is operable to heat and/or cool air to control an air temperature within the passenger cabin 24. The cabin temperature control system 34 may include, but is not limited to, a heating core for heating air, an evaporator for cooling air, a fan for moving the air, and ducts for controlling the movement of air within the passenger cabin 24. The specific configuration and operation of the cabin temperature control system 34 is not pertinent to the teachings of this disclosure, are known to those skilled in the art, and are therefore not described in detail herein.

The vehicle 20 includes a vehicle controller 36 for controlling the operation of one or more of the systems described above. The vehicle controller 36 may include a computer and/or processor, and include all software, hardware, memory, algorithms, connections, sensors, etc., necessary to manage and control the operation of the vehicle 20. As such, a method, described below, may be embodied as a program or algorithm operable on the vehicle controller 36. It should be appreciated that the vehicle controller 36 may include any device capable of analyzing data from various sensors, comparing data, making the necessary decisions required to control the operation of the vehicle 20 as described herein, and executing the required tasks necessary to control the operation of the vehicle 20 as described herein. The vehicle controller 36 may be referred to as a specialized computer, a control module, a controller, etc. Furthermore, it should be appreciated that the vehicle controller 36 may include multiple controllers, linked together for communication therebetween, and operable together as a unit to execute the process described below. Accordingly, while the detailed description refers to only a single vehicle controller 36, it should be appreciated that the process described below may be executed by several different vehicle controllers 36 acting together.

The vehicle controller 36 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. An example of volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The vehicle controller 36 includes tangible, non-transitory memory on which are recorded computer-executable instructions, including an autonomous vehicle 20 operation algorithm. The processor of the controller is operable to execute the autonomous vehicle 20 operation algorithm. The autonomous vehicle 20 operation algorithm implements a method of autonomously controlling operation of the vehicle 20 without the presence or input of a human operator. For example, the autonomous vehicle 20 operation algorithm controls one or more of the prime power source 26, the plurality of wheels 28, the suspension system 30, the braking system 32, and the cabin temperature control system 34, etc., without the presence or input of an operator. The specifics of how the autonomous vehicle 20 operation algorithm controls the operation of the vehicle 20 are beyond the scope of this disclosure, and are therefore not described in detail herein.

Figure 2:
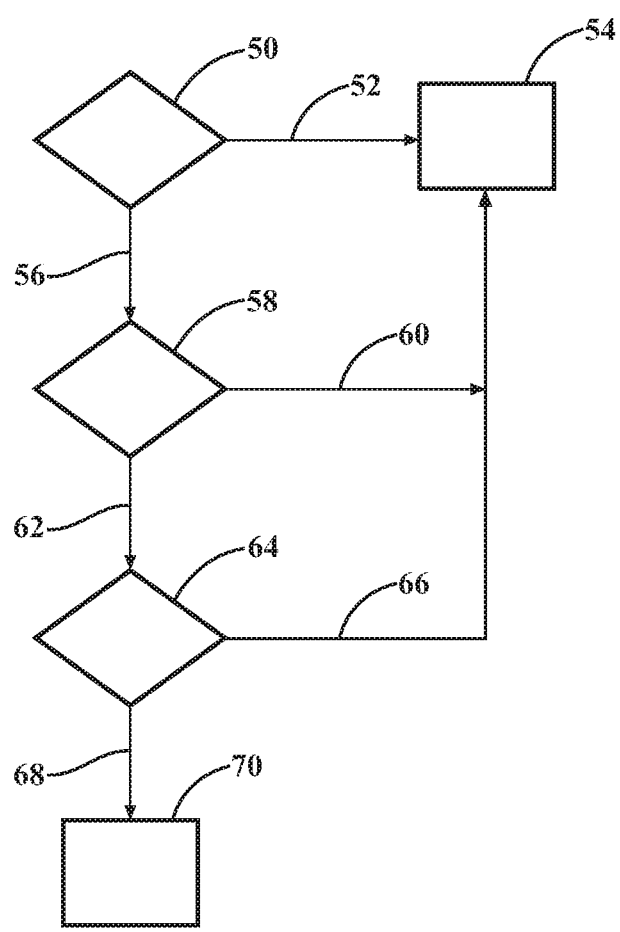
FIG. 2 is a flowchart representing a method of controlling the vehicle.

The tangible, non-transitory memory of the vehicle controller 36 further includes a passenger based control algorithm stored thereon. The processor is operable to execute the passenger based control algorithm to determine the presence of a passenger, and control the operation of the vehicle 20 based on whether or not the passenger cabin 24 is or is not occupied by a passenger. Specifically, referring to FIG. 2, the passenger based control algorithm, executed by the processor of the vehicle controller 36, determines if the vehicle 20 is currently operating autonomously, or is not currently operating autonomously. The step of determining if the vehicle 20 is or is not currently operating autonomously is generally indicted by box 50 in FIG. 2. The vehicle controller 36 may determine if the vehicle controller 36 is or is not currently operating autonomously in any suitable manner. For example, the passenger based control algorithm may determine if the vehicle controller 36 is or is not currently executing the autonomous vehicle 20 operating algorithm to operate the vehicle 20 autonomously, as described above.

If the vehicle 20 is not currently operating autonomously, generally indicated by line 52, then by default, the vehicle 20 is being controlled by a human operator, and the passenger cabin 24 is therefore currently occupied by a passenger. When the vehicle controller 36 determines that the vehicle 20 is not currently operating autonomously, the passenger based control algorithm controls the vehicle 20 using a set of passenger present operating parameters. The step of controlling the vehicle 20 using the set of passenger present operating parameters is generally indicated by box 54 in FIG. 2. The set of passenger present operating parameters control the vehicle 20 to provide at least a minimum level of passenger comfort. The set of passenger present operating parameters may enable at least one passenger comfort system. The minimum level of passenger comfort may include any operating aspect of the vehicle 20. For example, the minimum level of passenger comfort may include, but is not limited to, a maximum acceleration rate, a maximum deceleration rate, a maximum or minimum ride stiffness, a maximum cornering speed, a maximum and a minimum cabin temperature, etc. The vehicle controller 36 may control one or more of the prime power source 26, the plurality of wheels 28, the suspension system 30, an electronic ride control system (part of the suspension system 30), the braking system 32, and the cabin temperature control system 34, an entertainment system 40, a cabin lighting system 38, etc., to provide the minimum level of passenger comfort. The minimum level of passenger comfort may be provided at the expense of energy efficiency, or otherwise prevent the vehicle 20 from operating at certain levels that may be undesirable to a passenger. For example, the minimum level of passenger comfort may prevent the vehicle 20 from performing some diagnostic tests that require the vehicle 20 be operated at a certain level that is outside of the minimum level of passenger comfort.

If the vehicle controller 36 determines that the vehicle 20 is currently operating autonomously, generally indicated by line 56, then the passenger based control algorithm determines if the passenger cabin 24 is currently occupied by a passenger, or is not currently occupied by a passenger. The step of determining if the passenger compartment is or is not currently occupied by a passenger is generally indicated by box 58 in FIG. 2. It should be appreciated that the vehicle 20 may be currently operating autonomously, without any input, even when a human is occupying the passenger cabin 24, i.e., a passenger. The passenger based control algorithm may determine whether a passenger is present or is not present in the passenger cabin 24 in any suitable manner. For example, the vehicle 20 may be equipped with a passenger sensor 42 capable of sensing the presence of the passenger. More specifically, the passenger sensor 42 may include, but is not limited to, a camera positioned to view the passenger cabin 24 and capable of recognizing and/or identifying passengers, or a pressure sensor incorporated into a surface of the passenger cabin 24, such as a floor or seat surface, and capable of sensing pressure exerted by a passenger. It should be appreciated that a "passenger" as used herein may include, but is not limited to, a human being, a canine, a feline, a small mammal, a reptile, a bird, etc. If the passenger based control algorithm determines that the passenger cabin 24 is currently occupied by a passenger, generally indicated by line 60, then the passenger based control algorithm uses the set of passenger present operating parameters to control the operation of the vehicle 20 as described above.

When the passenger based control algorithm determines that the passenger cabin 24 of the vehicle 20 is not currently occupied by a passenger, generally indicated by line 62, then the passenger based control algorithm may determine if a passenger is expected to enter the vehicle 20 within a pre-defined time period. The step of determining if a passenger is expected to enter the vehicle 20 within the pre-defined time period is generally indicated by box 64 in FIG. 2. For example, the passenger based control algorithm may be configured to and capable of receiving a notification of a passenger arrival. For example, the vehicle controller 36 may be configured to receive a notification from a remote device, such as a smartphone, or alternatively from a central communication base, that a passenger intends to arrive at the vehicle 20. As such, the vehicle controller 36 may include a signal receiver 44 capable of receiving the notification of passenger arrival. Alternatively, the vehicle controller 36 may determine that the vehicle 20 may arrive to pick up the passenger within the pre-defined time period. When the passenger based control algorithm determines that the passenger cabin 24 is currently not occupied by a passenger, generally indicated by line 62, but a passenger will be arriving or entering the passenger cabin 24 within the pre-defined time period, generally indicated by line 66, then the passenger based control algorithm may control the vehicle 20 using the set of passenger present operating parameters as described above, generally indicated by box 54 in FIG. 2. For example, when the vehicle 20 is operating autonomously, and the passenger cabin 24 is not currently occupied with a passenger, but a passenger is expected to enter the passenger cabin 24 within the pre-defined time period, then the passenger based control algorithm may control the cabin temperature control system 34 to adjust an air temperature within the passenger cabin 24 to a pre-defined temperature.

The passenger based control algorithm may apply the set of passenger not-present operating parameters when the vehicle 20 is currently operating autonomously, generally indicated by line 56, the passenger cabin 24 is not currently occupied by a passenger, generally indicated by line 62, and a passenger is not expected to enter the passenger cabin 24 within the pre-defined time period, generally indicated by line 68. The step of controlling the vehicle 20 using the set of passenger not-present operating parameters is generally indicated by box 70 in FIG. 2. The set of passenger not-present operating parameters control the vehicle 20 for one of optimal energy efficiency, or for optimal vehicle 20 diagnostic performance. The set of passenger not-present operating parameters may disable one or more passenger comfort systems. For example, one or more of the systems of the vehicle 20, such as the cabin temperature control system 34, the entertainment system 40, the cabin lighting system 38, active ride control systems, may require energy to operate, which when no passengers are present, are not required. Accordingly, the set of passenger not-present operating parameters may control the vehicle 20 to conserve energy by disabling systems that are not necessary due to the lack of a passenger. Additionally, the prime power source 26, e.g., an internal combustion engine, may be controlled in a manner that is more efficient, but that would otherwise be undesirable to a passenger. For example, the most efficient control of the prime power source 26 may provide a rough idle, automatic start/stop, rough shift patterns, etc. While these may be undesirable to a passenger, they may be used to maximize energy efficiency when no passengers are currently occupying the passenger cabin 24. The vehicle controller 36 may control one or more of the prime power source 26, e.g., engine operation or transmission operation, the plurality of wheels 28, the suspension system 30, an electronic ride control system, the braking system 32, vehicle 20 acceleration, vehicle 20 deceleration, a vehicle 20 turn rate, a vehicle 20 cornering speed, the cabin temperature control system 34, the entertainment system 40, the cabin lighting system 38, etc., to achieve optimal energy efficiency, or for optimal vehicle 20 diagnostic performance.

The tangible, non-transitory memory of the vehicle controller 36 may include a diagnostic control algorithm stored thereon. The processor is operable to execute the diagnostic control algorithm to perform one or more vehicle 20 diagnostics. As noted above, when the vehicle 20 is currently operating autonomously, and the passenger cabin 24 of the vehicle 20 is not currently occupied by the vehicle 20, the passenger based control algorithm may use the passenger not-present operating parameters. The passenger not-present operating parameters may include executing the diagnostic control algorithm.

Figure 3:
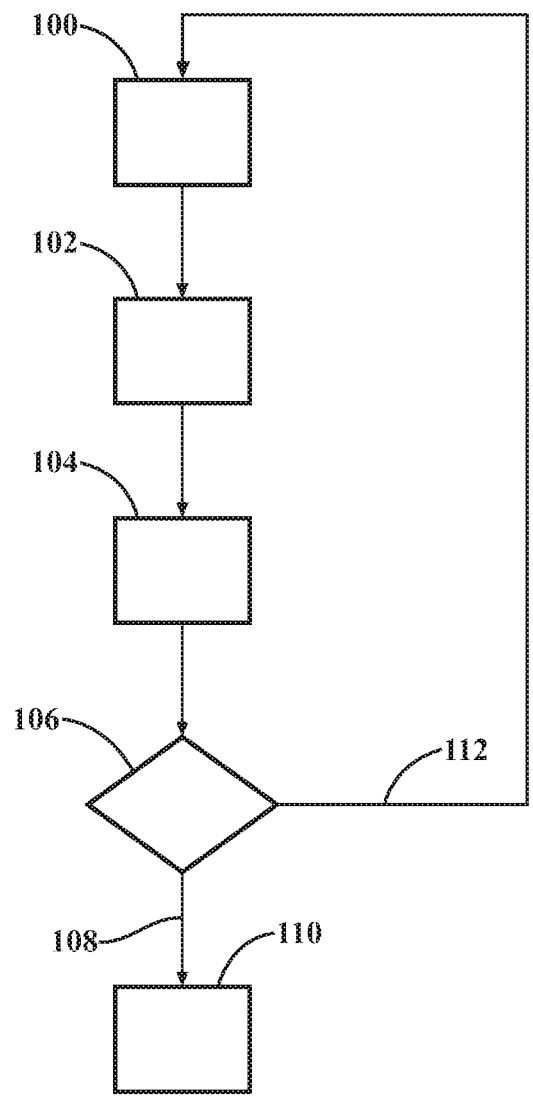
FIG. 3 is a flowchart representing a method of performing a diagnostic test of the vehicle.

Referring to FIG. 3, the diagnostic control algorithm may include controlling at least one vehicle 20 system in a specific manner that would be undesirable to a passenger. However, since no passenger is currently occupying the passenger cabin 24, the diagnostic control algorithm may be executed without affecting a passenger. For example, the diagnostic control algorithm may adjust at least one of the prime power source 26, the plurality of wheels 28, the suspension system 30, the braking system 32, etc., in order to achieve a desired vehicle 20 operating input. The step of controlling the vehicle 20 to achieve the desired vehicle 20 operating input is generally indicated by box 100 in FIG. 3. The desired vehicle 20 operating input may include, but is not limited to, a desired acceleration rate, a desired deceleration rate, a desired cornering rate, etc. The desired vehicle 20 operating input may be an aggressive driving maneuver that would be undesirable to a passenger, but is required to diagnose certain systems of the vehicle 20, such as for example, the suspension system 30 or the braking system 32.

Once the diagnostic control algorithm has adjusted the operation of the vehicle 20 to achieve the desired vehicle 20 operating input, the vehicle controller 36 senses a vehicle 20 response to the desired vehicle 20 operating input, using at least one sensor. The step of sensing the response to the desired vehicle 20 operating input is generally indicated by box 102 in FIG. 3. The specific response and the specific sensor used to sense the response may vary depending upon the specific system be tested. For example, a diagnosis of the suspension system 30 and/or the braking system 32 may use one or more accelerometers, to sense a pitch and/or a roll angle, or to sense acceleration and/or deceleration.

The sensed response to the desired vehicle 20 operating input may be stored in the memory of the vehicle controller 36 for future use. The step of saving the response to the desired vehicle 20 operating input is generally indicated by box 104 in FIG. 3. The diagnostic control algorithm may then compare the saved response to the desired vehicle 20 operating input to a determinable standard to determine if the response to the desired vehicle 20 operating input is within the standard, or if the response to the desired vehicle 20 operating input is outside the standard. The step of determining if the response to the desired vehicle 20 operating input is or is not within the standard is general indicated by box 106 in FIG. 3. The standard may be defined in any suitable manner, and will depend upon the specific system being tested. For example, the standard may include, but is not limited to, a maximum value, a minimum value, or a range of allowable values.

If the diagnostic control algorithm compares the response to the desired vehicle 20 operating input and determines that the response is outside of the standard, e.g., less than a minimum allowable value, greater than a maximum allowable value, or outside of an allowable range of values, generally indicated by line 108, then the diagnostic control algorithm may notify a control center of the variation, and request or signal that vehicle 20 repairs may be required. The step of notifying the control center that the response to the desired vehicle 20 operating input is outside the allowable standard is generally indicated by box 110 in FIG. 3. For example, the diagnostic control algorithm may light a warning lamp in the vehicle 20, or register an error code, may sound a chime, or may send a message to a remotely located control center. Additionally, depending upon the system being tested and the variation from the standard, the diagnostic control algorithm may only allow operation of the vehicle 20 in a reduced power mode to incentivize vehicle 20 repairs. If the diagnostic control algorithm determines that the response to the desired vehicle 20 operating input is within the allowable standard, generally indicated by line 112, then the diagnostic control algorithm may then return to the beginning of the process, and repeat the diagnostic procedure or execute another diagnostic procedure that adjusts the operation of the vehicle 20 to achieve another desired vehicle 20 operating input.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a vehicle, the method comprising:
   determining if the vehicle is currently operating autonomously, or is not currently operating autonomously, with a vehicle controller;
   determining if the vehicle is currently occupied by a passenger, or is not currently occupied by a passenger, with the vehicle controller;
   controlling at least one vehicle system, with the vehicle controller, to operate using a set of passenger present operating parameters, when the vehicle is currently operating autonomously and the vehicle is currently occupied by a passenger, wherein the set of passenger present operating parameters controls the vehicle to provide a minimum level of passenger comfort; and
   controlling at least one vehicle system, with the vehicle controller, to operate using a set of passenger not-present operating parameters, when the vehicle is currently operating autonomously and the vehicle is not currently occupied by a passenger, wherein the set of passenger not-present operating parameters controls the vehicle for one of optimal energy efficiency or optimal vehicle diagnostic performance, and provides less than the minimum level of passenger comfort.

2. The method set forth in claim 1, wherein controlling the at least one vehicle system to operate using the set of passenger present operating parameters includes enabling at least one passenger comfort system.

3. The method set forth in claim 2, wherein controlling the at least one vehicle system to operate using the set of passenger not-present operating parameters includes disabling at least one passenger comfort system.

4. The method set forth in claim 3, wherein the at least one passenger comfort system includes at least one of: a cabin temperature control system, an entertainment system, a cabin lighting system, and an electronic ride control system.

5. The method set forth in claim 1, wherein controlling the at least one vehicle system to operate using the set of passenger present operating parameters, and controlling the at least one vehicle system to operate using the set of passenger not-present operating parameters, include adjusting at least one of an engine operation, a transmission operation, a vehicle acceleration, a vehicle deceleration, a vehicle turn rate, or a vehicle cornering speed.

6. The method set forth in claim 1, further comprising determining if a passenger is expected to enter the vehicle within a pre-defined time period, when the vehicle is not currently occupied.

7. The method set forth in claim 6, further comprising controlling at least one vehicle system to operate using the set of passenger present operating parameters when the vehicle is not currently occupied, but a passenger is expected to enter the vehicle within the pre-defined time period.

8. The method set forth in claim 7, wherein controlling at least one vehicle system to operate using the set of passenger present operating parameters when the vehicle is not currently occupied, but a passenger is expected to enter the vehicle within the pre-defined time period, includes controlling a cabin temperature control system to adjust a cabin temperature to a pre-defined temperature.

9. The method set forth in claim 1, wherein controlling the at least one vehicle system to operate using a set of passenger not-present operating parameters, when the vehicle is not currently operating autonomously and the vehicle is not currently occupied by a passenger, includes controlling a diagnostic system to execute a diagnostic vehicle test.

10. The method set forth in claim 9, wherein controlling the diagnostic system to execute the diagnostic vehicle test includes adjusting at least one of an engine operation, a transmission operation, a vehicle acceleration, a vehicle deceleration, a vehicle turn rate, or a vehicle cornering speed, in order to achieve a desired vehicle operating input.

11. The method set forth in claim 10, wherein controlling the diagnostic system to execute the diagnostic vehicle test includes sensing a vehicle response to the desired vehicle operating input.

12. The method set forth in claim 11, wherein controlling the diagnostic system to execute the diagnostic vehicle test includes storing the response to the desired vehicle operating input in a memory of the vehicle controller.

13. The method set forth in claim 12, wherein controlling the diagnostic system to execute the diagnostic vehicle test includes comparing the response to the desired vehicle operating input to a standard, with the vehicle controller, to determine if the response to the desired vehicle operating input is within the standard, or if the response to the desired vehicle operating input is outside the standard.

14. The method set forth in claim 13, wherein controlling the diagnostic system to execute the diagnostic vehicle test includes notifying a control center when the response to the desired vehicle operating input is outside the standard.

15. The method set forth in claim 1, wherein determining if the vehicle is currently occupied by a passenger, or is not currently occupied by a passenger, includes sensing the presence of a passenger, with a sensor, wherein a passenger includes at least one of a human being, a canine, a feline, a small mammal, a reptile, a bird.

16. The method set forth in claim 15, wherein sensing the presence of the passenger, with a sensor, is further defined as sensing the presence of the passenger with one of a camera or a seat pressure sensor.

17. A vehicle comprising:
   a body structure including a passenger cabin;
   a prime power source attached to and supported by the body structure, and operable to provide propulsive power;
   a plurality of wheels attached to and supported by the body structure, and operable to transmit torque from the prime power source to a ground surface, and to steer the body structure;
   a suspension system interconnecting the plurality of wheels and the body structure;
   a braking system attached to and supported by the suspension system, and operable to resist rotation of the plurality of wheels;
   a cabin temperature control system for heating or cooling an air temperature within the passenger cabin;
   a vehicle controller including a processor and tangible, non-transitory memory on which is recorded an autonomous vehicle operation algorithm, wherein the processor is operable to execute the autonomous vehicle operating algorithm to autonomously control operation of at least one of the prime power source, the plurality of wheels, the suspension system, the braking system, and the cabin temperature control system, without the presence or input of an operator;
   wherein the tangible, non-transitory memory of the vehicle controller includes a passenger based control algorithm stored thereon, wherein the processor is operable to execute the passenger based control algorithm to:

determine if the vehicle controller is currently executing the autonomous vehicle operating algorithm to operate the vehicle autonomously;

determine if the passenger cabin is currently occupied by a passenger, or is not currently occupied by a passenger, with a passenger sensor;

control at least one of the prime power source, the plurality of wheels, the suspension system, the braking system, and the cabin temperature control system, using a set of passenger present operating parameters, when the vehicle controller is currently executing the autonomous vehicle operating algorithm to operate the vehicle autonomously and the passenger cabin is currently occupied by a passenger, wherein the set of passenger present operating parameters controls the vehicle to provide a minimum level of passenger comfort; and control at least one of the prime power source, the plurality of wheels, the suspension system, the braking system, and the cabin temperature control system, using a set of passenger not-present operating parameters, when the vehicle controller is currently executing the autonomous vehicle operating algorithm to operate the vehicle autonomously and the passenger cabin is not currently occupied by a passenger, wherein the set of passenger not-present operating parameters controls the vehicle for one of optimal energy efficiency or for optimal vehicle diagnostic performance, and provides less than the minimum level of passenger comfort.

18. The vehicle set forth in claim 17, wherein the passenger based control algorithm includes executable instructions operable to:
receive a notification of a passenger arrival; and
control the cabin temperature control system to adjust an air temperature within the passenger cabin to a predefined temperature.

19. The vehicle set forth in claim 17, wherein the tangible, non-transitory memory of the vehicle controller includes a diagnostic control algorithm stored thereon, wherein the processor is operable to execute the diagnostic control algorithm to:
adjust at least one of the prime power source, the plurality of wheels, the suspension system, the braking system, and the cabin temperature control system, in order to achieve a desired vehicle operating input;
sense a vehicle response to the desired vehicle operating input, with at least one sensor;
store the response to the desired vehicle operating input in the memory of the vehicle controller;
compare the response to the desired vehicle operating input to a standard to determine if the response to the desired vehicle operating input is within the standard, or if the response to the desired vehicle operating input is outside the standard; and
notify a control center when the response to the desired vehicle operating input is outside the standard.

20. The vehicle set forth in claim 17, wherein the passenger sensor includes one of a camera positioned to view the passenger cabin, or a pressure sensor operable to sense a change in pressure on a surface within the passenger cabin.

* * * * *